US010571952B2

(12) United States Patent
Snyder (10) Patent No.: US 10,571,952 B2
(45) Date of Patent: Feb. 25, 2020

(54) MULTI-MODE GIMBAL TRANSMITTER

(71) Applicant: HORIZON HOBBY, LLC, Champaign, IL (US)

(72) Inventor: Danny Snyder, Champaign, IL (US)

(73) Assignee: HORIZON HOBBY, LLC, Champaign, IL (US)

( * ) Notice: Subject to any disclaimer, the term of this patent is extended or adjusted under 35 U.S.C. 154(b) by 0 days.

(21) Appl. No.: 16/433,877

(22) Filed: Jun. 6, 2019

(65) Prior Publication Data

US 2019/0324493 A1    Oct. 24, 2019

Related U.S. Application Data

(62) Division of application No. 15/698,119, filed on Sep. 7, 2017, now Pat. No. 10,338,628.

(60) Provisional application No. 62/385,080, filed on Sep. 8, 2016.

(51) Int. Cl.
| | |
|---|---|
| G05G 9/04 | (2006.01) |
| G05G 9/047 | (2006.01) |
| G05D 1/00 | (2006.01) |
| G05G 5/04 | (2006.01) |
| A63H 27/00 | (2006.01) |
| G05G 5/05 | (2006.01) |
| G05G 1/04 | (2006.01) |
| A63H 30/04 | (2006.01) |
| G08C 17/02 | (2006.01) |

(52) U.S. Cl.
CPC .............. *G05G 9/047* (2013.01); *A63H 27/02* (2013.01); *A63H 27/12* (2013.01); *A63H 30/04* (2013.01); *G05D 1/0016* (2013.01); *G05G 1/04* (2013.01); *G05G 5/04* (2013.01); *G05G 5/05* (2013.01); *G05G 2009/04718* (2013.01); *G05G 2505/00* (2013.01); *G08C 17/02* (2013.01); *G08C 2201/90* (2013.01)

(58) Field of Classification Search
CPC ................ G05G 9/047; G05G 1/04; G05G 5/04; G05G 5/05; A63H 27/02; A63H 27/12; A63H 30/04; G05D 1/0016
USPC ............................................ 340/12.5–12.55
See application file for complete search history.

(56) References Cited

U.S. PATENT DOCUMENTS 3,175,786 A * 3/1965 Frank ................... G05D 1/0858
244/17.13
5,117,992 A    6/1992 Simkus, Jr. et al.
(Continued)

OTHER PUBLICATIONS

Horizon Hobby, Inc. "Quique Somenzini—Special Edition" Instruction Manual, DX18QQ, 2012; 74 pages.
(Continued)

*Primary Examiner* — Allen T Cao
(74) *Attorney, Agent, or Firm* — Baker Botts LLP (57) ABSTRACT

A wireless transmitter includes a pair of control sticks, circuitry coupled to control sticks, and an antenna coupled to the circuitry. The circuitry is configured to process signals produced by the control sticks to provide control inputs for the speed, direction, and other flight characteristics of the model aircraft being controlled by the transmitter. The transmitter is configured for multiple operational modes in which the pair of control sticks engage or disengage functionality, such as return-to-center functionality, vertical or horizontal position limiting functionality, or position select functionality.

10 Claims, 9 Drawing Sheets

(56) References Cited

U.S. PATENT DOCUMENTS

| | | | |
|---|---|---|---|
| 2007/0252044 A1* | 11/2007 | Jackson | B64G 1/286 244/165 |
| 2008/0116186 A1 | 5/2008 | Luck et al. | |
| 2011/0077801 A1 | 3/2011 | Tanaka | |
| 2011/0306423 A1 | 12/2011 | Calderon | |
| 2013/0343480 A1 | 12/2013 | Eliaz et al. | |

OTHER PUBLICATIONS

Horizon Hobby, Inc. "DX8" Instruction Manual, Spektrum, 2010; 42 pages.

* cited by examiner

MULTI-MODE GIMBAL TRANSMITTER

RELATED APPLICATIONS

This application is a divisional application of U.S. patent application Ser. No. 15/698,119 filed Sep. 7, 2017, which claims priority to U.S. Provisional Application Ser. No. 62/385,080 filed Sep. 8, 2016, and which is incorporated herein by reference in its entirety.

FIELD OF THE DISCLOSURE

The present disclosure relates generally to wireless transmitters, and more specifically to wireless transmitters for use with remote controlled model aircraft.

BACKGROUND

Wireless transmitters are used to operate remote controlled model aircraft such as planes, helicopters, and multirotors. The flight characteristics of each aircraft are different, and an operator may need several transmitters with different settings to adjust for these differences. Transmitters can be expensive to purchase and lack adjustability.

SUMMARY

The present disclosure may comprise one or more of the following features and combinations thereof.

According to an aspect of the present disclosure, a wireless transmitter includes a pair of control sticks, circuitry coupled to control sticks, and an antenna coupled to the circuitry. The circuitry is configured to process signals produced by the control sticks to provide control inputs for the speed, direction, and other flight characteristics of the model aircraft being controlled by the transmitter.

In illustrative embodiments, a mode-selector switch is coupled to control sticks and configured to allow transmitter to operate in a number of different modes such that the combined operation of the control sticks is different in each mode. Each of the control sticks includes a carriage and a gimbal mechanism mounted on the carriage. A mode adjuster is coupled to the mode-selector switch and configured to change the physical operation of the control stick depending on the selected mode.

In illustrative embodiments, gimbal biasers engage with the gimbal mechanism to provide a return-to-center function. A rotation dampener engages with the gimbal mechanism to provide a position select function of the gimbal mechanism. A rotation limiter is configured to control an amount of rotation of the gimbal mechanism depending on the selected mode.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same. As used herein, indications of direction are made with reference to the orientations shown in the figures and are not intended to be limiting of the disclosure.

Figure 1:
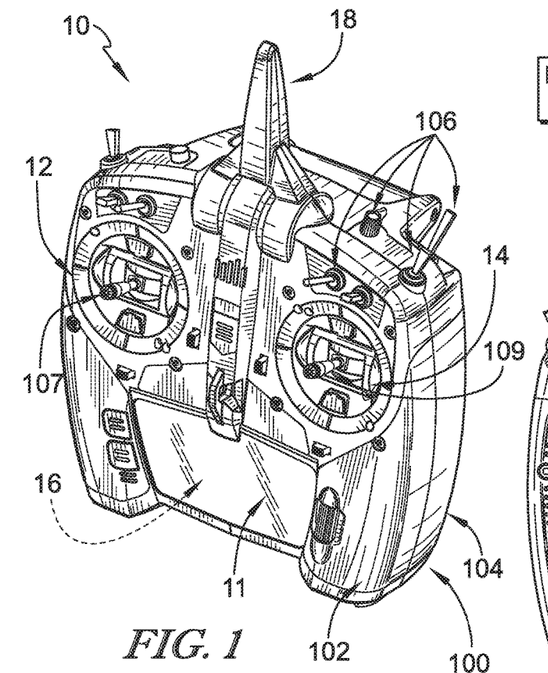
FIG. 1 is a is a front perspective view of a wireless transmitter in accordance with the present disclosure showing that the transmitter includes a pair of control sticks used to control movement of a remote controlled model aircraft.

A wireless transmitter 10 in accordance with the present disclosure is shown in FIG. 1. Transmitter 10 includes a pair of control sticks 12, 14, circuitry 16 coupled to control sticks 12, 14 to process signals produced by control sticks 12, 14, and an antenna 18 to communicate with a remote controlled model aircraft, such as a plane, helicopter, or multirotor for example. A user engages with control sticks 12, 14 to provide control inputs for the speed, direction, and other flight characteristics of the model aircraft.

A shell 100 of transmitter 10 includes a front cover 102 and a back cover 104 coupled to front cover 102 as shown in FIG. 1. A user interface 11 communicates with circuitry 16 and allows a user of transmitter 10 to customize operation of transmitter 10 and any associated model aircraft. Additional control switches 106 of transmitter 10 cooperate with user interface and circuitry 16 to further customize operation of transmitter 10.

Figure 2:
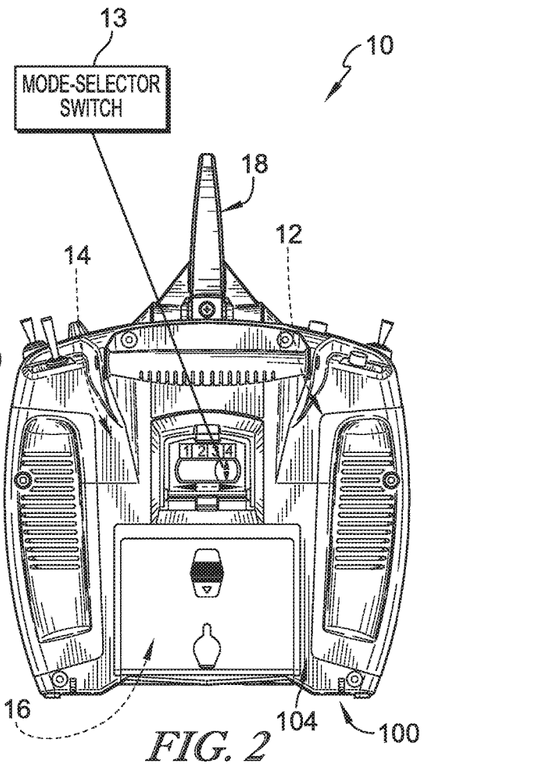
FIG. 2 is a rear elevation view of the transmitter of FIG. 1 showing that a mode-selector switch is accessible to a user of the transmitter and suggesting that the mode-selector switch is used to change the control sticks into different modes of operation as suggested in FIG. 3.
Figure 3:
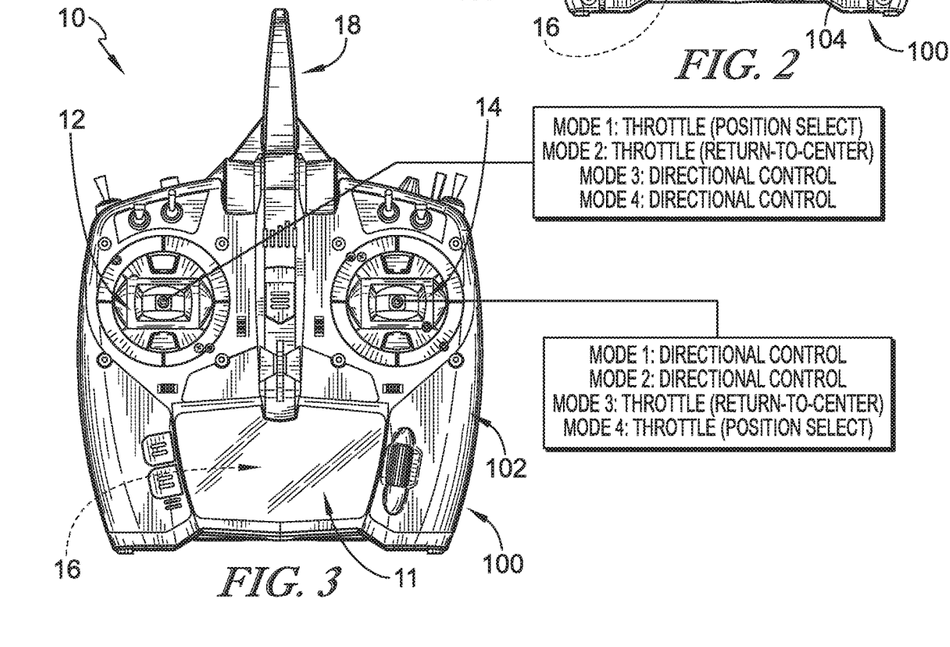
FIG. 3 is a front elevation view of the transmitter of FIG. 1 showing that a user interface is positioned on the transmitter and suggesting that the mode-selector switch and user interface cooperate to control the operation of each control stick depending on the selected mode.

In the illustrative embodiment, a mode-selector switch 13 is coupled to control sticks 12, 14 and configured to allow transmitter 10 to operate in a number of different modes as suggested in FIGS. 2 and 3. A user engages mode-selector switch 13 to slide mode-selector switch 13 relative to back cover 104 to select which mode of operation of transmitter 10 the user desires. The combined operation of control sticks 12, 14 is different in each mode to allow flexibility of transmitter 10 in controlling different types of model aircraft and for different user preferences.

Figure 4:
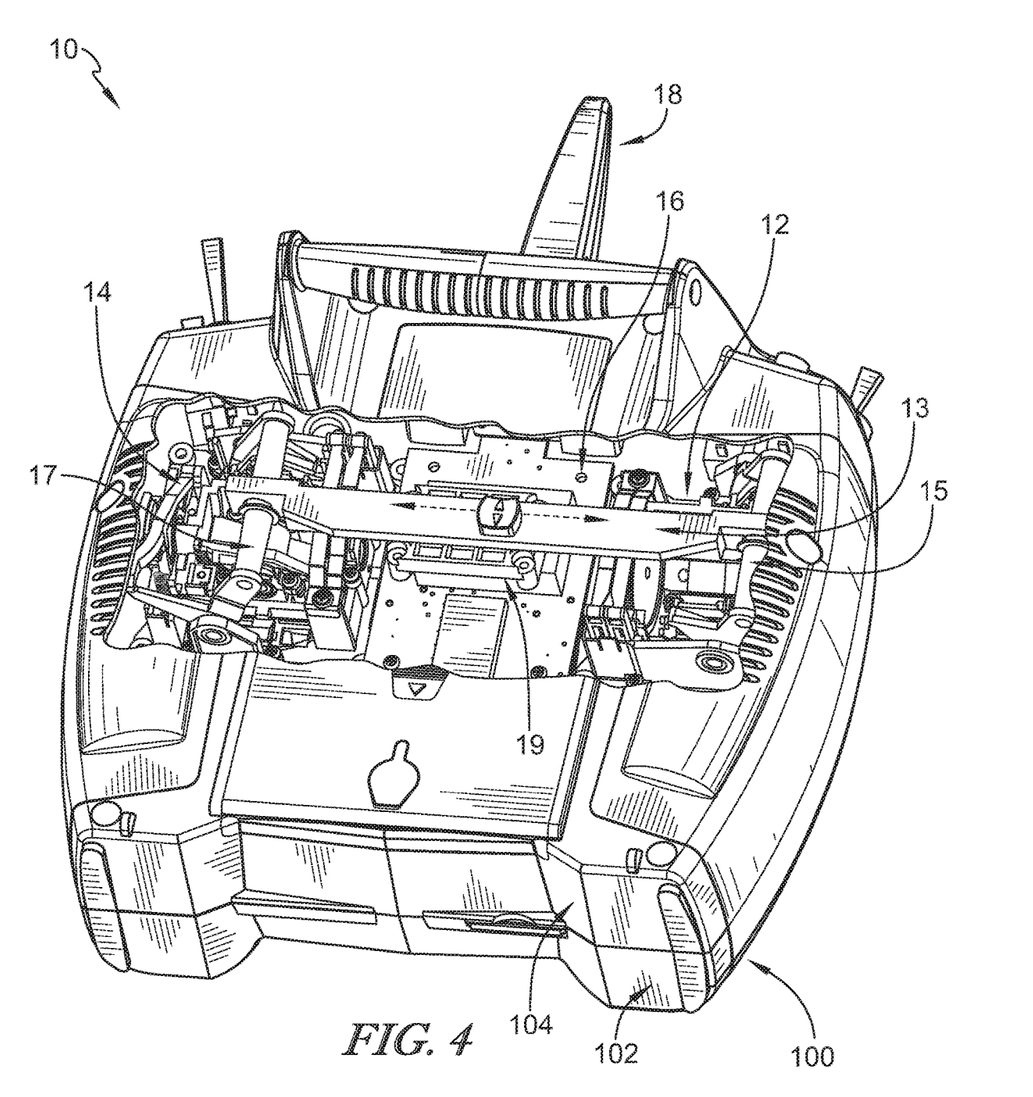
FIG. 4 is a rear perspective view of the transmitter of FIG. 1 with portions cut away to show that the mode-selector switch is coupled to the control sticks and suggesting that the mode-selector switch is movable relative to the control sticks to change the control sticks into the different modes of operation as suggested in FIGS. 9-20.

Mode-selector switch 13 engages with mode adjusters 15, 17 of each control stick 12, 14, respectively, and is configured to alter the physical operation of control sticks 12, 14 when mode-selector switch 13 is moved to different mode selection positions as suggested in FIG. 4. In some embodiments, mode-selector switch 13 is also configured to cooperate with circuitry 16 to alter how signals produced by control sticks 12, 14 are processed in each mode. In some embodiments, a user engages with user interface 11 to alter how signals produced by control sticks 12, 14 are processed in each mode. In the illustrative embodiment, a detent mechanism 19 is used to control movement of mode-selector switch 13 to block unintentional movement of mode-selector switch 13 to different mode selection positions during operation of transmitter 10.

Knobs 107, 109 are coupled to each control stick 12, 14, respectively, as shown in FIG. 1. A user engages with knobs 107, 109 to operate control sticks 12, 14. Distal ends of knobs 107, 109 can be moved vertically and horizontally (relative to the orientation in FIG. 1) including combinations thereof. Knobs 107, 109 are shown in a "center-center" orientation where the knobs 107, 109 are centered vertically and horizontally. In the illustrative embodiment, control sticks 12, 14 are configured to provide a return-to-center function to bring knobs 107, 109 back to a horizontally centered orientation, and a vertically centered orientation depending on the selected mode of operation for transmitter 10, when a user disengages knobs 107, 109.

Figure 5:
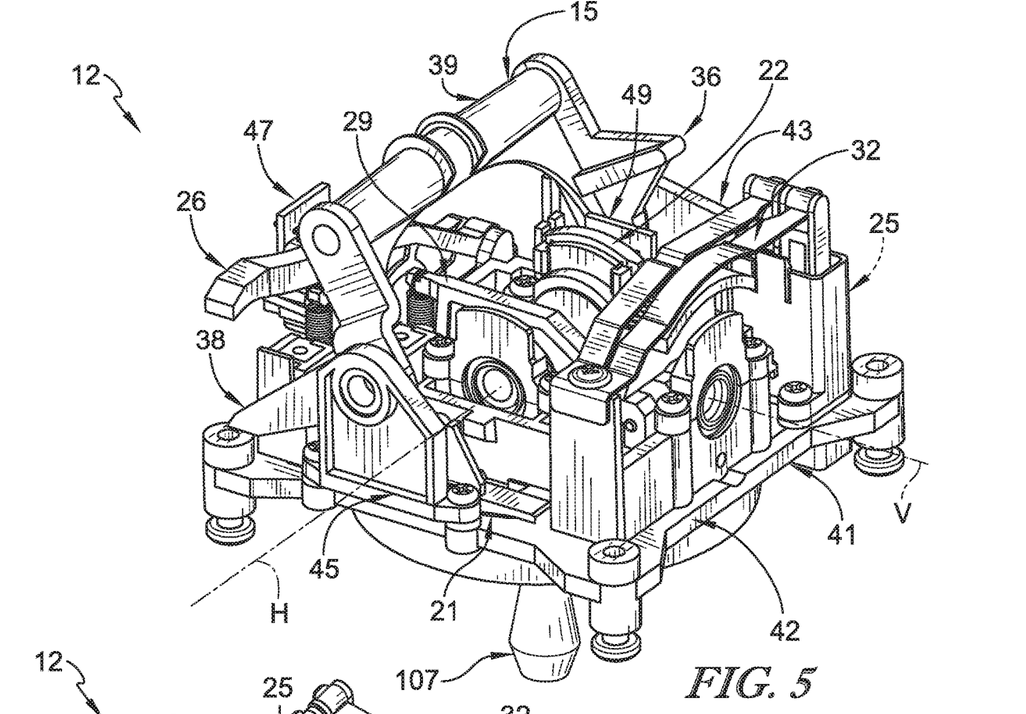
FIG. 5 is a rear perspective view of one of the control sticks of FIG. 4 showing that the control stick includes a carriage and a gimbal mechanism mounted on the carriage and suggesting that the gimbal mechanism is movable about at least a vertical-rotation axis (V) and a horizontal-rotation axis (H)
Figure 6:
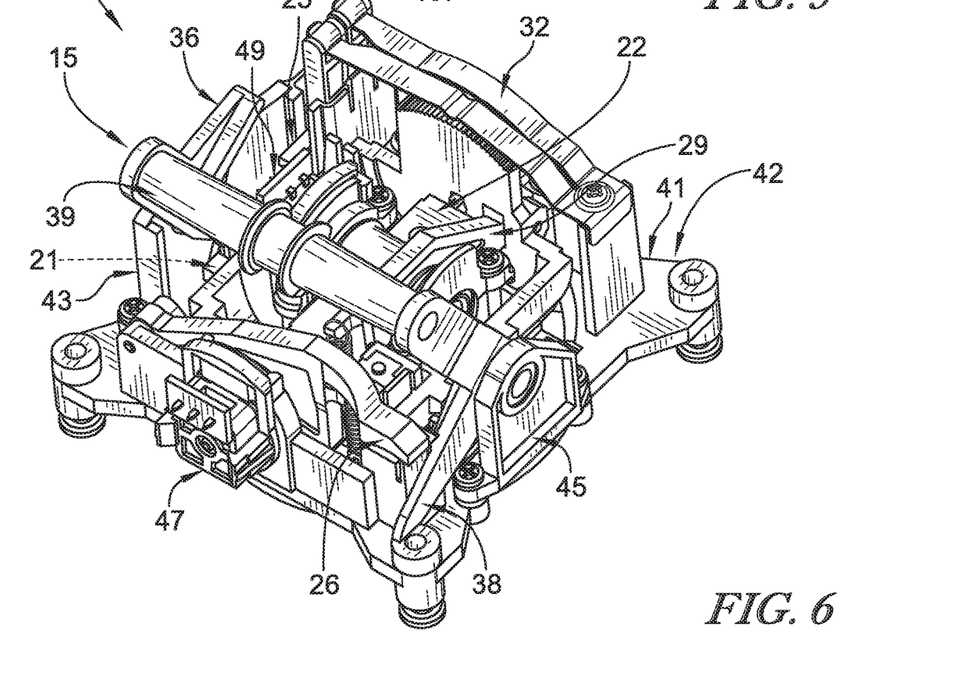
FIG. 6 is a similar view to FIG. 5.

An illustrative control stick 12 in accordance with the present disclosure is shown in FIGS. 5 and 6. Control stick 14 is of similar construction to control stick 12, and discussion of control stick 12 applies with equal force to control stick 14. Control stick 12 includes a gimbal mechanism 22 mounted on a carriage 42 for movement relative to a vertical-rotation axis V and a horizontal-rotation axis H as suggested in FIG. 5.

Knob 107 is coupled to gimbal mechanism 22 to allow a user to move gimbal mechanism 22 as suggested in FIG. 5. Sensors 47, 49, such as potentiometers, detect a relative position of gimbal mechanism 22 and provide signals to circuitry 16 to communicate control inputs from the user with the model aircraft through antenna 18. Gimbal biasers 26, 29 engage with gimbal mechanism 22 to bias gimbal mechanism 22 toward the center-center orientation.

Carriage 42 includes a base plate 41 and side plates 43, 45 as suggested in FIGS. 5 and 6. Gimbal mechanism 22 is mounted on base plate 41, and side plates 43, 45 couple with base plate 41 to hold mode adjuster 15 on base plate 41. A vertical-rotation dampener 32 is coupled to base plate 41 and a plunger 25 is coupled to side plate 43 to control movement of vertical-rotation dampener 32 relative to gimbal mechanism 22. Vertical-rotation dampener 32 is configured to engage with gimbal mechanism 22 to hold gimbal mechanism 22 in a vertical orientation selected by a user to provide a "position select" function of control stick 12.

Mode adjuster 15 is mounted for rotation relative to carriage 42 as suggested in FIGS. 5 and 6. Mode adjuster 15 includes a cross bar 39, a depressor 36 coupled to one end of cross bar 39, and a lifter arm 38 coupled to an opposing end of cross bar 39. Cross bar 39 engages with side plates 43, 45 to hold mode adjuster 15 on base plate 41. Depressor 36 is configured to cooperate with plunger 25 to control engagement of vertical-rotation dampener 32 with gimbal mechanism 22. Lifter arm 38 is configured to cooperate with gimbal biaser 26 to control operation of a vertical return-to-center function of the control stick 12. Mode adjuster 15 also engages with a vertical-position limiter 21 to move vertical-position limiter 21 relative to base plate 41 as mode adjuster 15 rotates. Vertical-position limiter 21 is configured to engage with gimbal mechanism 22 to limit a range of rotation about vertical-rotation axis V in some modes and allow a full range of motion of gimbal mechanism 22 in other modes.

Figure 7:
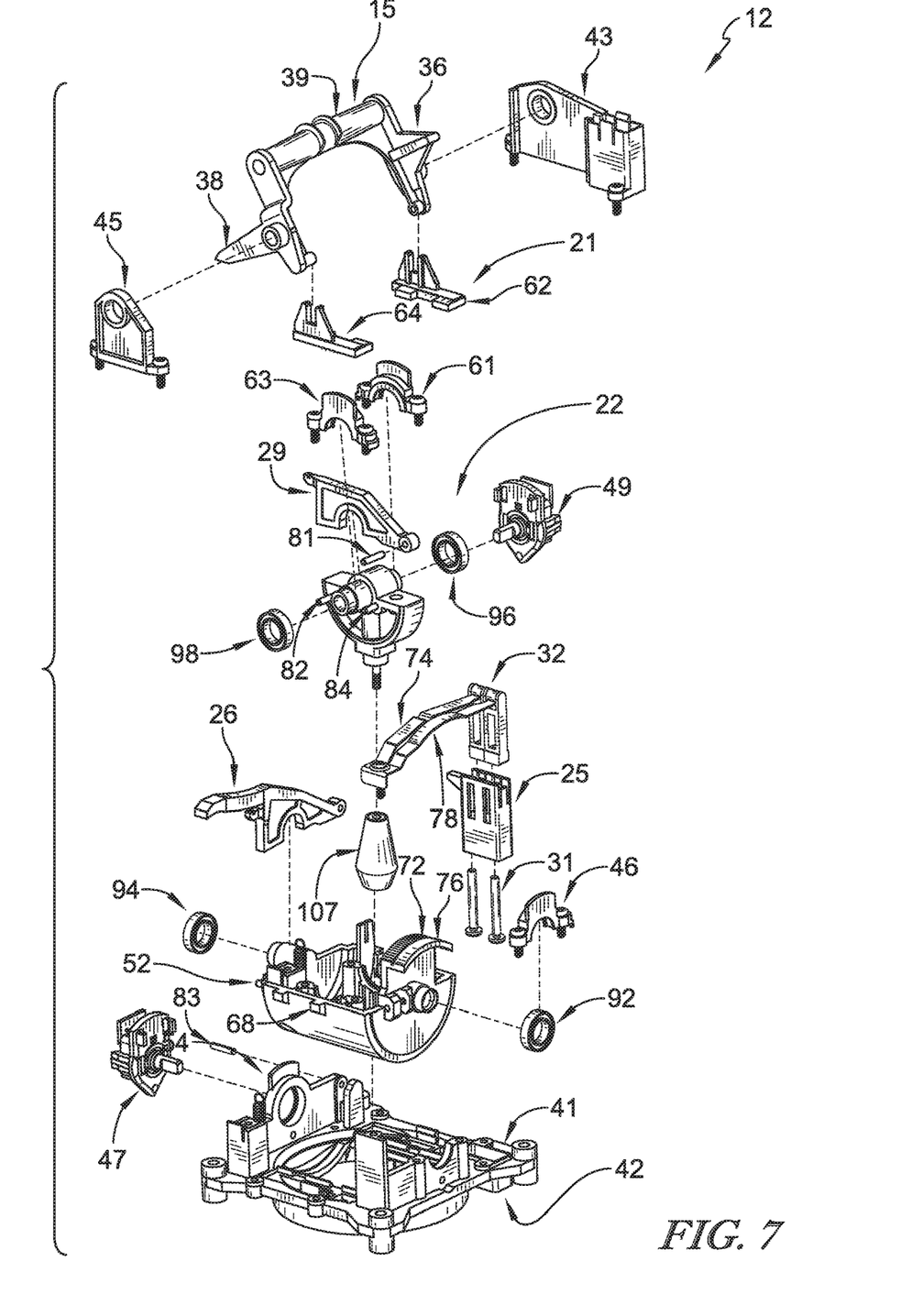
FIG. 7 is a perspective exploded assembly view of the control stick of FIG. 5 showing that the gimbal mechanism includes a carrier gimbal mounted on the carriage and a float gimbal mounted on the carrier gimbal.
Figure 8:
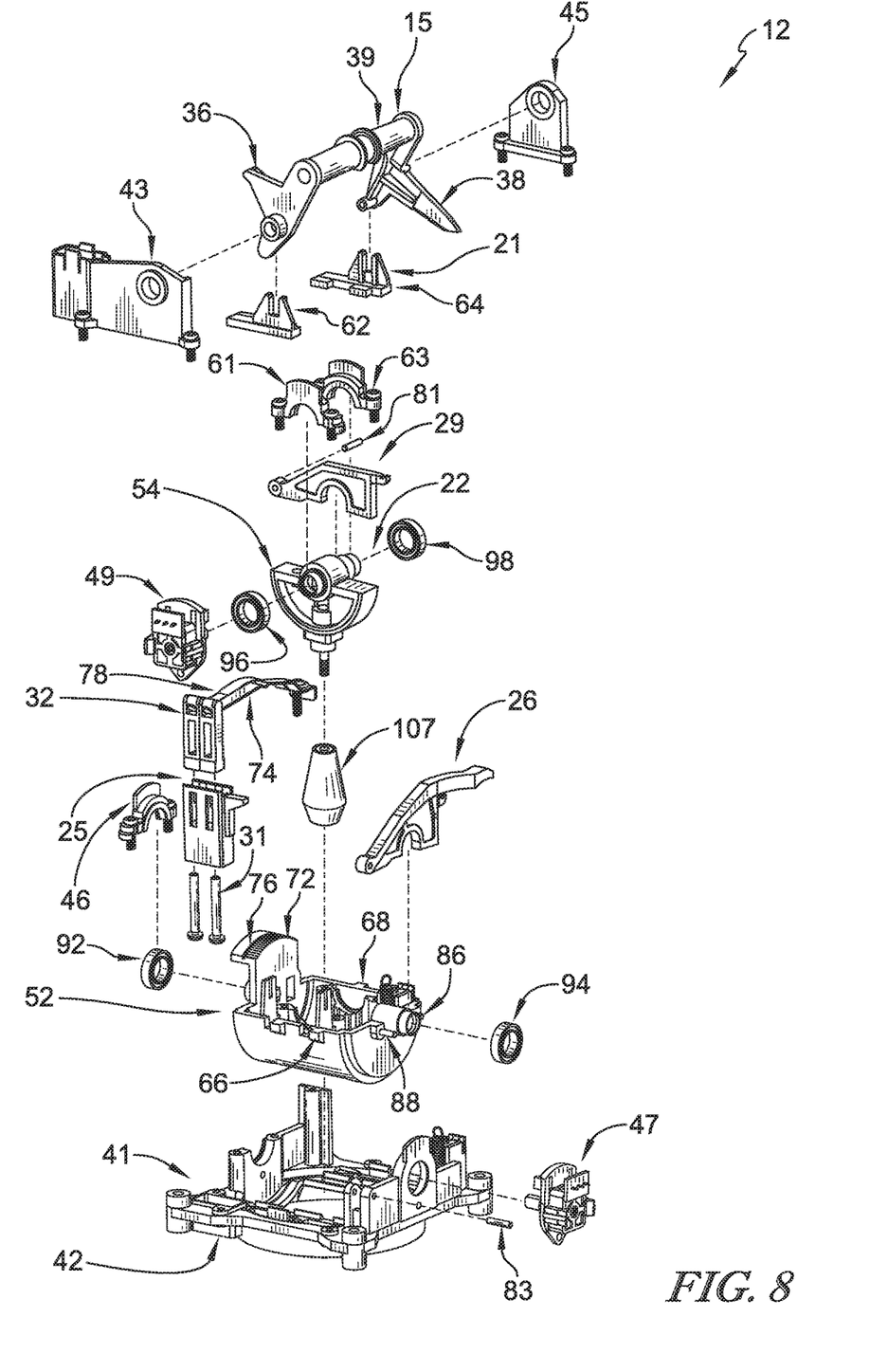
FIG. 8 is a view similar to FIG. 7.

Gimbal mechanism 22 includes a carrier gimbal 52 mounted on carriage 42 and a float gimbal 54 mounted on carrier gimbal 52 as suggested in FIGS. 7 and 8. Bearings 92, 94, 96, 98 allow free movement of gimbals 52, 54. A collar 46 couples with base plate 41 to hold carrier gimbal 52 on base plate 41. Collars 61, 63 couple with carrier gimbal 52 to hold float gimbal 54 on carrier gimbal 52.

Sensor 47 is mounted on base plate 41 and engages with carrier gimbal 52 as suggested in FIGS. 7 and 8. Sensor 49 is mounted on carrier gimbal 52 and engages with float gimbal 54. Vertical-position limiter 21 includes a pair of blocker plates 62, 64. Blocker plate 62 is configured to cooperate with a lug 66 of carrier gimbal 52, and blocker plate 64 is configured to cooperate with a lug 68, to control the amount of rotation of carrier gimbal 52 relative to base plate 41 depending on the mode of transmitter 10.

A float-gimbal biaser 29 is coupled to carrier gimbal 52 by a pin 81 as suggested in FIGS. 7 and 8. Float-gimbal biaser 29 is spring loaded to be biased toward float gimbal 54. Float-gimbal biaser 29 engages with pins 82, 84 of float gimbal 54 to provide a return-to-center function of float gimbal 54 as suggested in FIG. 8. In some embodiments, an amount of spring loading on float-gimbal biaser 29 is adjustable.

A carrier-gimbal biaser 26 is coupled to base plate 41 by a pin 83 as suggested in FIGS. 7 and 8. Carrier-gimbal biaser 26 is spring loaded to be biased toward carrier gimbal 52. Carrier-gimbal biaser 26 engages with pins 86, 88 of carrier gimbal 52 to provide a return-to-center function of carrier gimbal 52 depending on the mode of transmitter 10 as suggested in FIG. 7. In some embodiments, an amount of spring loading on carrier-gimbal biaser 26 is adjustable.

Vertical-rotation dampener 32 is mounted on base plate 41 to engage with carrier gimbal 52 to provide a position select function of control stick 12 depending on the mode of transmitter 10 as suggested in FIGS. 7 and 8. Carrier gimbal 52 includes a ratchet surface 72 and a friction surface 76. Vertical-rotation dampener 32 includes a ratchet band 74 configured to engage with ratchet surface 72 and a friction band 78 configured to engage with friction surface 76. Ratchet band 74 and friction band 78 move with plunger 25 as mode adjuster 15 rotates. Ratchet band 74 and friction band 78 are independently adjustable using fasteners 31, such as bolts.

In the illustrative embodiment, transmitter 10 is configured to operate in at least four different modes as suggested in FIG. 3. Mode-selector switch 13 is movable relative to back cover 104 between different mode selection positions corresponding to the different modes of operation of transmitter 10 as suggested in FIGS. 9, 12, 15, and 18. Mode-selector switch 13 is configured to cause corresponding movement of mode adjusters 15, 17 of each control stick 12, 14 during movement of mode-selector switch 13 as suggested in FIGS. 10, 13, 16, and 19. Movement of mode adjusters 15, 17 causes corresponding physical adjustments to the operation of control sticks 12, 14 as suggested in FIGS. 11, 14, 17, and 20.

Figure 9:
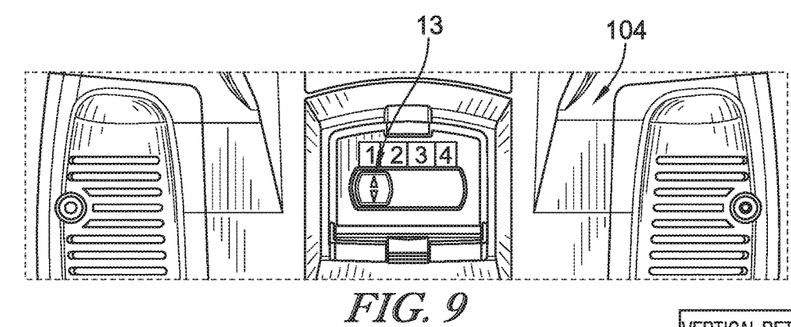
FIG. 9 is an enlarged view of the transmitter of FIG. 2 showing the mode-selector switch in a position corresponding to Mode 1 of the control sticks.

A first mode selection position of mode-selector switch 13 corresponding to a first mode ("Mode 1") of transmitter 10 is shown in FIG. 9. In Mode 1, control stick 12 acts as the "throttle" control and control stick 14 acts as the "direction" control for the model aircraft. In some embodiments, Mode 1 is used with model airplanes where control stick 14 moves the ailerons (roll) and elevators (pitch) and control stick 12 adjusts engine output and moves the rudder (yaw). In some embodiments, Mode 1 can also be used with model helicopters or multirotors.

Figure 10:
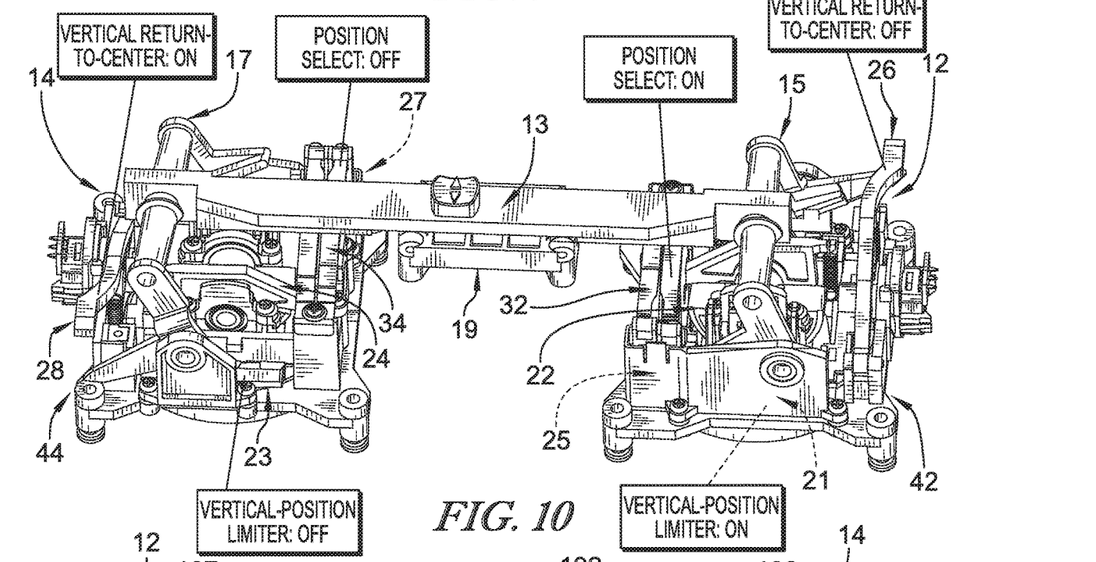
FIG. 10 is a rear perspective view of the control sticks of FIG. 4 showing that the control sticks are of similar construction and rotated relative to one another and suggesting that a mode adjuster of each control stick is in a first position corresponding to Mode 1 when the mode-selector switch is in the corresponding Mode 1 position.
Figure 11:
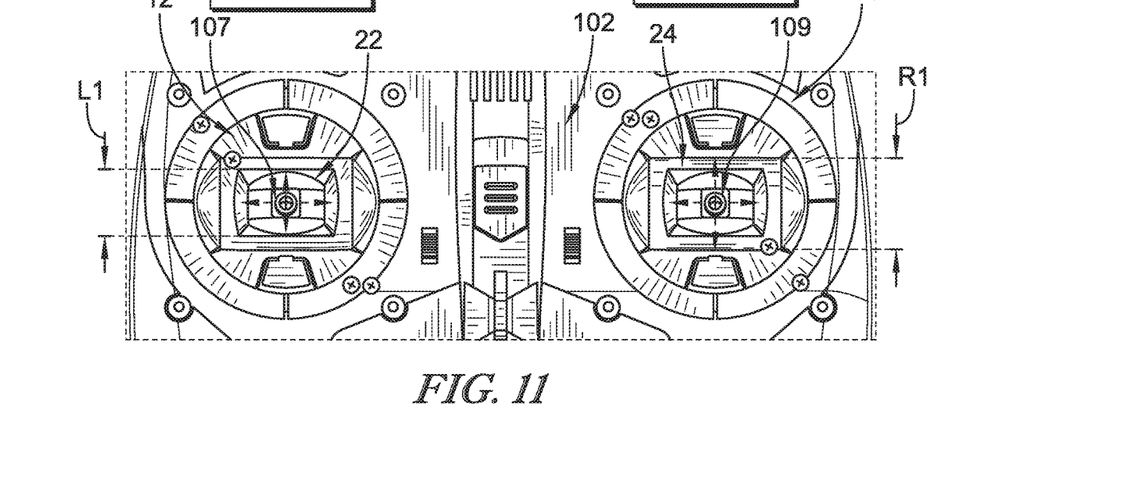
FIG. 11 is an enlarged view of the transmitter of FIG. 3 showing the control sticks in a centered orientation and suggesting that the vertical travel (L1) of the left control stick is less than the vertical travel (R1) of the right control stick in Mode 1.

In the illustrative embodiment, mode-selector switch 13 is engaged with mode adjusters 15, 17 of control sticks 12, 14 as shown in FIG. 10. Control sticks 12, 14 are rotated generally 180 degrees relative to one another and spaced apart from one another. In Mode 1, mode adjuster 15 engages with gimbal biaser 26 to raise gimbal biaser 26 away from gimbal mechanism 22 and disengage the vertical return-to-center function of control stick 12 as suggested in FIG. 10. Mode adjuster 15 also engages with plunger 25 to engage vertical-rotation dampener 32 with gimbal mechanism 22 to provide the position select function of control stick 12. Vertical-position limiter 21 is positioned to engage with gimbal mechanism 22 to limit vertical rotation (R1) of gimbal mechanism 22 as suggested in FIGS. 10 and 11.

A gimbal biaser 28 (similar to gimbal biaser 26) is engaged with gimbal mechanism 24 (similar to gimbal mechanism 22) to provide the vertical return-to-center function of control stick 14 in Mode 1 as suggested in FIG. 10. A vertical-rotation dampener 34 (similar to vertical-rotation dampener 32) is disengaged from gimbal mechanism 24. A vertical-position limiter 23 (similar to vertical-position limiter 21) is positioned to allow gimbal mechanism 24 to travel through a full range of vertical rotation (L1) as suggested in FIGS. 10 and 11.

Figure 12:
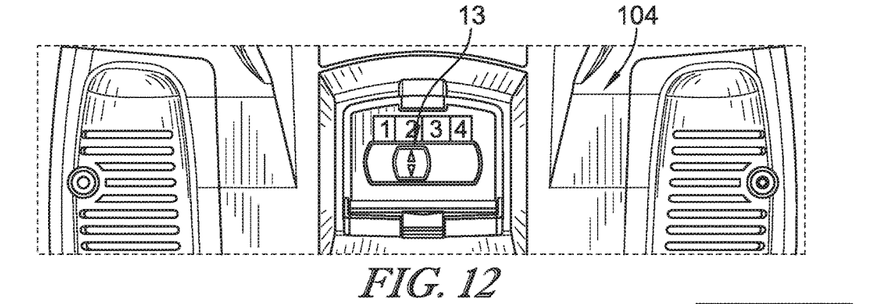
FIG. 12 is a view similar to FIG. 9 showing the mode-selector switch in a position corresponding to Mode 2 of the control sticks.

A second mode selection position of mode-selector switch 13 corresponding to a second mode ("Mode 2") of transmitter 10 is shown in FIG. 12. In Mode 2, control stick 12 acts as the "throttle" control and control stick 14 acts as the "direction" control for the model aircraft. In some embodiments, Mode 2 is used with model helicopters and multirotors where control stick 14 adjusts front-to-back tilt (pitch) and side-to-side tilt (roll) and control stick 12 adjusts engine output and pivoting (yaw). In some embodiments, Mode 2 can also be used with model airplanes.

Figure 13:
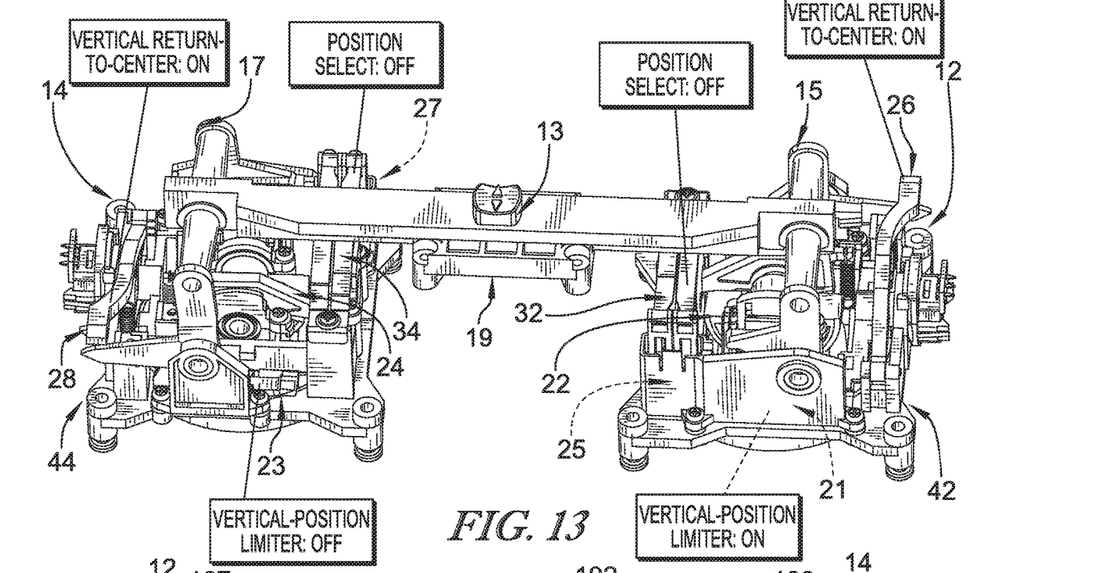
FIG. 13 is a view similar to FIG. 10 showing that the mode adjuster of each control stick is in a second position corresponding to Mode 2 when the mode-selector switch is in the corresponding Mode 2 position.
Figure 14:
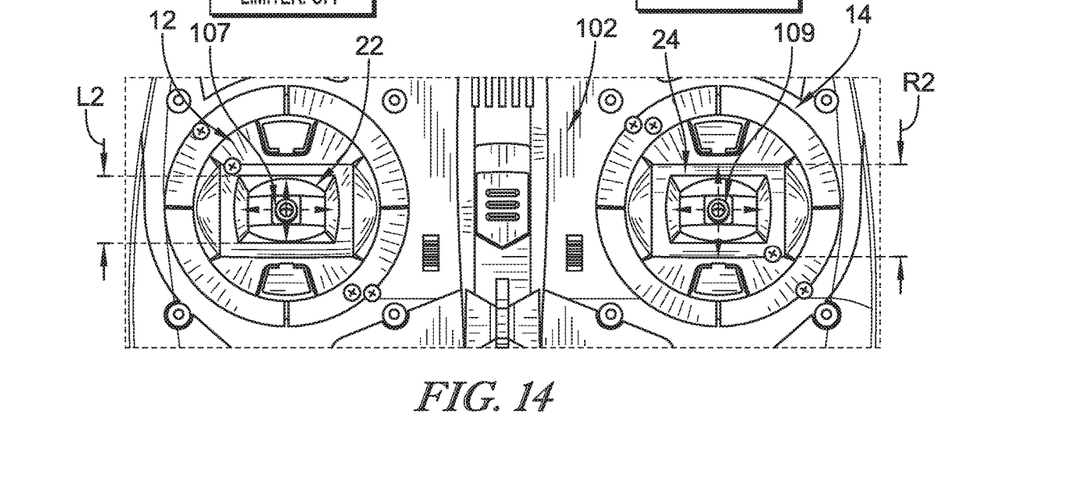
FIG. 14 is a view similar to FIG. 11 showing the control sticks in a centered orientation and suggesting that the vertical travel (L2) of the left control stick is less than the vertical travel (R2) of the right control stick in Mode 2.

In the illustrative embodiment, gimbal biaser 26 is engaged with gimbal mechanism 22 to disengage the vertical return-to-center function of control stick 12 in Mode 2 as suggested in FIG. 13. Vertical-rotation dampener 32 is disengaged from gimbal mechanism 22. Vertical-position limiter 21 is positioned to engage with gimbal mechanism 22 to limit vertical rotation (R2) of gimbal mechanism 22 as suggested in FIGS. 13 and 14.

Gimbal biaser 28 is engaged with gimbal mechanism 24 to provide the vertical return-to-center function of control stick 14 in Mode 2 as suggested in FIG. 13. Vertical-rotation dampener 34 is disengaged from gimbal mechanism 24. Vertical-position limiter 23 is positioned to allow gimbal mechanism 24 to travel through a full range of vertical rotation (L2) as suggested in FIGS. 13 and 14.

Figure 15:
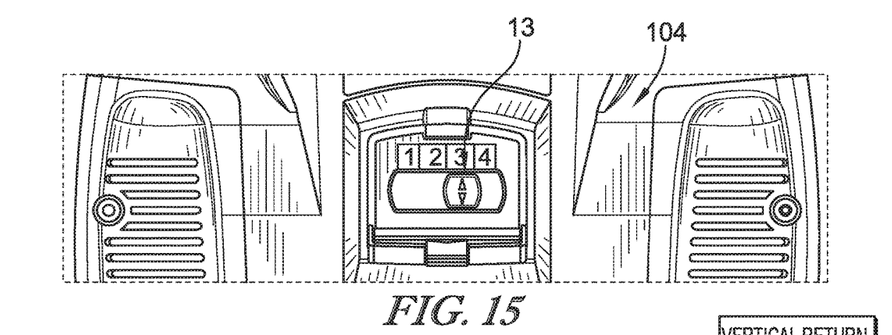
FIG. 15 is a view similar to FIG. 12 showing the mode-selector switch in a position corresponding to Mode 3 of the control sticks.

A third mode selection position of mode-selector switch 13 corresponding to a third mode ("Mode 3") of transmitter 10 is shown in FIG. 15. In Mode 3, control stick 12 acts as the "direction" control and control stick 14 acts as the "throttle" control for the model aircraft. In some embodiments, Mode 3 is used with model helicopters and multirotors where control stick 12 adjusts front-to-back tilt (pitch) and side-to-side tilt (roll) and control stick 14 adjusts engine output and pivoting (yaw). In some embodiments, Mode 3 can also be used with model airplanes.

Figure 16:
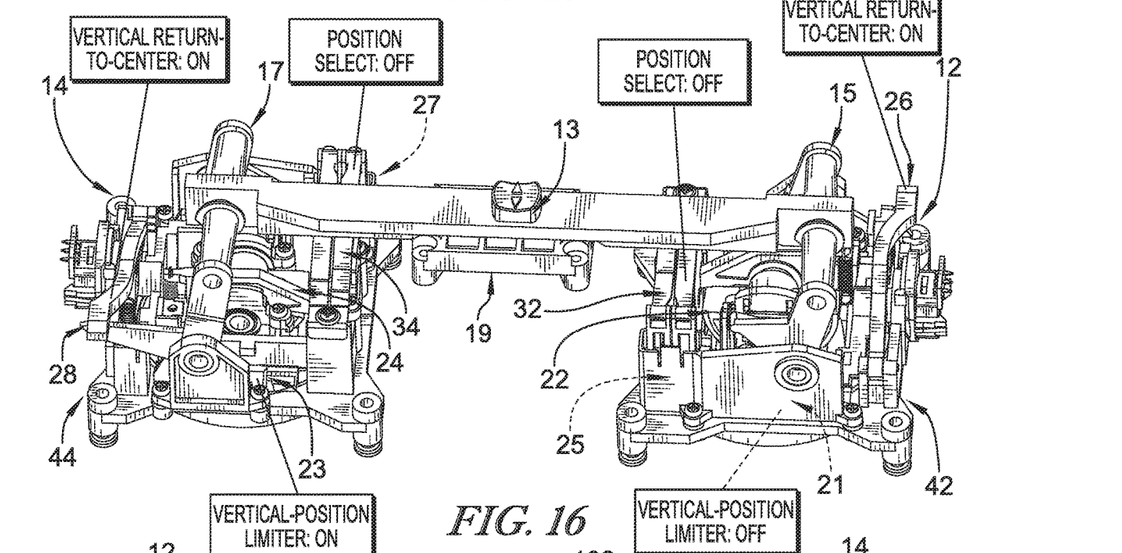
FIG. 16 is a view similar to FIG. 13 showing that the mode adjuster of each control stick is in a third position corresponding to Mode 3 when the mode-selector switch is in the corresponding Mode 3 position.
Figure 17:
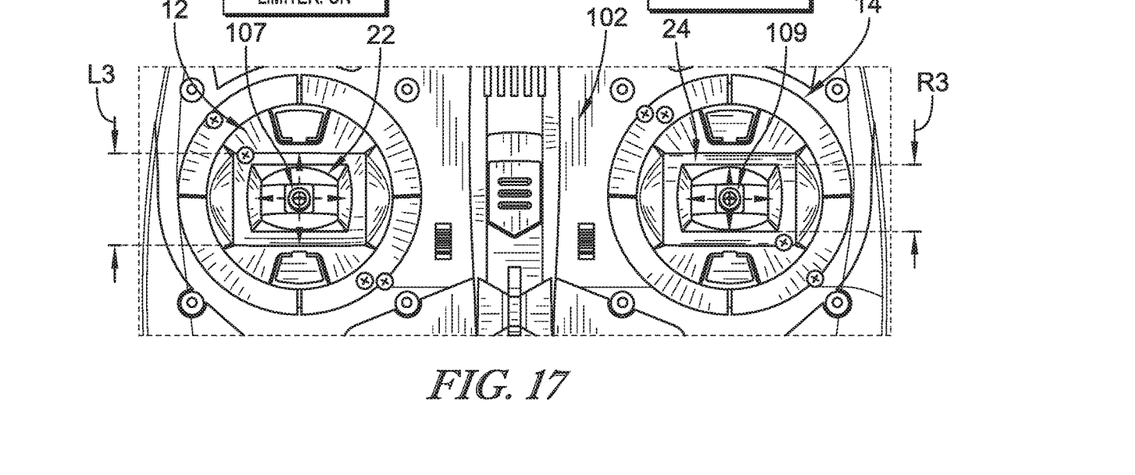
FIG. 17 is a view similar to FIG. 14 showing the control sticks in a centered orientation and suggesting that the vertical travel (R3) of the right control stick is less than the vertical travel (L3) of the left control stick in Mode 3.

In the illustrative embodiment, gimbal biaser 26 is engaged with gimbal mechanism 22 to provide the vertical return-to-center function of control stick 12 in Mode 3 as suggested in FIG. 16. Vertical-rotation dampener 32 is disengaged from gimbal mechanism 22. Vertical-position limiter 21 is positioned to allow gimbal mechanism 24 to travel through a full range of vertical rotation (R3) as suggested in FIGS. 16 and 17.

Gimbal biaser 28 is engaged with gimbal mechanism 24 to provide the vertical return-to-center function of control stick 14 in Mode 3 as suggested in FIG. 16. Vertical-rotation dampener 34 is disengaged from gimbal mechanism 24. Vertical-position limiter 23 is positioned to engage with gimbal mechanism 24 to limit vertical rotation (L3) of gimbal mechanism 24 as suggested in FIGS. 16 and 17.

Figure 18:
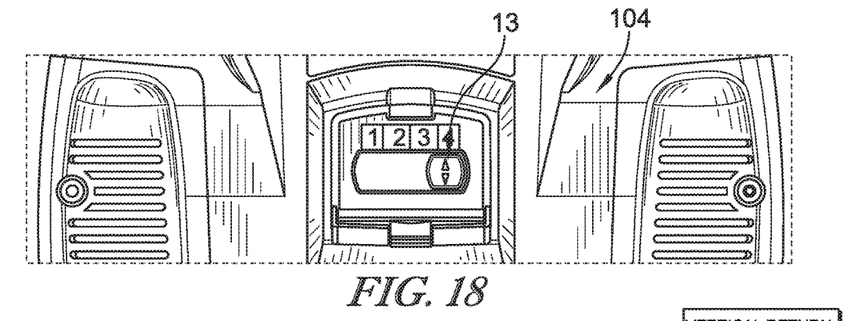
FIG. 18 is a view similar to FIG. 15 showing the mode-selector switch in a position corresponding to Mode 4 of the control sticks.

A fourth mode selection position of mode-selector switch 13 corresponding to a fourth mode ("Mode 4") of transmitter 10 is shown in FIG. 18. In Mode 4, control stick 12 acts as the "direction" control and control stick 14 acts as the "throttle" control for the model aircraft. In some embodiments, Mode 4 is used with model airplanes where control stick 12 moves the ailerons (roll) and elevators (pitch) and control stick 14 adjusts engine output and moves the rudder (yaw). In some embodiments, Mode 4 can also be used with model helicopters or multirotors.

Figure 19:
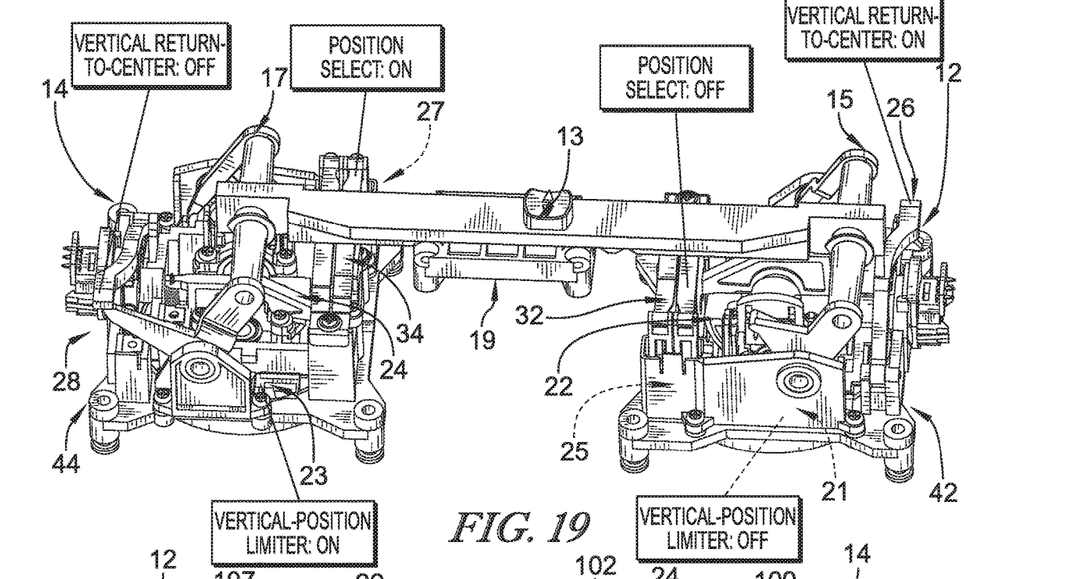
FIG. 19 is a view similar to FIG. 16 showing that the mode adjuster of each control stick is in a fourth position corresponding to Mode 4 when the mode-selector switch is in the corresponding Mode 4 position.
Figure 20:
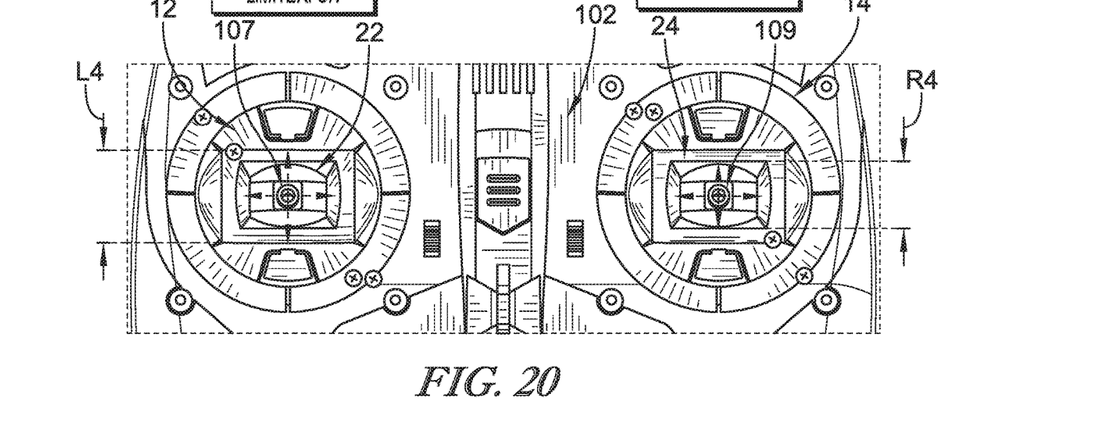
FIG. 20 is a view similar to FIG. 17 showing the control sticks in a centered orientation and suggesting that the vertical travel (R4) of the right control stick is less than the vertical travel (L4) of the left control stick in Mode 4.

Gimbal biaser 26 is engaged with gimbal mechanism 22 to provide the vertical return-to-center function of control stick 12 in Mode 4 as suggested in FIG. 19. Vertical-rotation dampener 32 is disengaged from gimbal mechanism 22. Vertical-position limiter 21 is positioned to allow gimbal mechanism 22 to travel through a full range of vertical rotation (R4) as suggested in FIGS. 19 and 20.

Mode adjuster 17 engages with gimbal biaser 28 to raise gimbal biaser 28 away from gimbal mechanism 24 and disengage the vertical return-to-center function of control stick 14 as suggested in FIG. 19. Mode adjuster 15 also engages with plunger 27 (similar to plunger 25) to engage vertical-rotation dampener 34 with gimbal mechanism 24 to provide the position select function of control stick 14. Vertical-position limiter 23 is positioned to engage with gimbal mechanism 24 to limit vertical rotation (L4) of gimbal mechanism 24 as suggested in FIGS. 19 and 20.

In illustrative embodiments, the gimbal design lets you change gimbal spring configurations simply by moving a slider switch on the back of the transmitter. No tools are required. Just select the spring configuration that matches the mode you are using and model type you are flying. There are four spring configurations to choose from: Normal Throttle for Modes 1 and 4 (Air, Heli and Sailplane Model Types) and Spring-Centered Throttle for Modes 2 and 3 (Multirotor Model Type). The slider switch is protected by a hinged cover that prevents you from accidentally changing spring configurations in flight.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A control stick comprising:
    a gimbal mechanism coupled to a carriage with a base plate and side plates, wherein the gimbal mechanism allows movement relative to at least two axes;
    a sensor coupled to the carriage, wherein the sensor detects a relative position of the gimbal mechanism and generates sensor output;
    a gimbal biaser coupled to the gimbal mechanism and operable to bias gimbal mechanism toward a center orientation;
    a dampener coupled to the base plate and operable to hold gimbal mechanism in an orientation to provide a position select function;
    a mode adjuster mounted for rotation relative to the carriage;
    a position limiter configured to engage with the mode adjuster and to move relative to the base plate as the mode adjuster rotates, wherein the position limiter is configured to limit a range of rotation of the gimbal mechanism in one operational mode and to allow a full range of rotation of the gimbal mechanism in another operational mode.

2. The control stick of claim 1, wherein the mode adjuster further comprises a cross bar configured to hold the mode adjuster on the carriage.

3. The control stick of claim 2, wherein the mode adjuster further comprises a depressor coupled to an end of the cross bar and configured to cooperate with a plunger to control engagement of the dampener.

4. The control stick of claim 3, wherein the mode adjuster further comprises a lifter arm coupled to an opposing end of the cross bar, configured to cooperate with the gimbal biaser to control operation of a return-to-center function of the control stick.

5. The control stick of claim 4, wherein the gimbal biaser is operable to bias the gimbal mechanism towards a vertical center orientation.

6. The control stick of claim 5, wherein the position limiter is operable to limit the range in a vertical direction.

7. The control stick of claim 6, wherein the gimbal biaser is further operable to bias the gimbal mechanism towards a horizontal orientation.

8. The control stick of claim 7, wherein the control stick is operable to disengage the gimbal biaser in at least one direction.

9. The control stick of claim 8, where the position limiter is further operable to limit the range in a horizontal direction.

10. The control stick of claim 9, wherein the control stick is operable to disengage the position limiter in at least one direction.

* * * * *